United States Patent [19]

Gates

[11] 4,113,273
[45] Sep. 12, 1978

[54] MULTIPLE IMPLEMENT FOLDING HITCH

[76] Inventor: Michael Gates, Lansford, N. Dak. 58750

[21] Appl. No.: 813,517

[22] Filed: Jul. 7, 1977

[51] Int. Cl.² .............................................. B60D 1/14
[52] U.S. Cl. ........................................ 280/413; 56/7; 172/311
[58] Field of Search .......... 280/411 R, 411 A, 411 C, 280/412, 413; 172/311, 456, 662; 56/6, 7, 228, 385, DIG. 14

[56] References Cited

U.S. PATENT DOCUMENTS

| | | | |
|---|---|---|---|
| 2,808,273 | 10/1957 | French | 280/412 |
| 3,620,550 | 11/1971 | Hornung | 172/311 X |

Primary Examiner—John A. Pekar
Attorney, Agent, or Firm—Zarley, McKee, Thomte, Voorhees & Sease

[57] ABSTRACT

A multiple implement folding hitch designed to permit a plurality of implements to be pulled in a side-by-side relationship during field operations and adapted to permit the effective width of the implements to be reduced for transport purposes. The hitch comprises a transversely extending frame comprising a plurality of frame members pivotally secured together in an end-to-end relationship. First and second spaced apart trailing implements are operatively secured to opposite ends of the frame. A first tubular member extends forwardly from the transversely extending frame and has its forward end adapted to be connected to the prime mover. A second tubular member is telescopically received by the rearward end of the first tubular member and has a third trailing implement connected thereto which is positioned between the first and second implements. First and second elongated members are pivotally connected at their forward ends to the first tubular member and extend rearwardly and outwardly therefrom. The rearward ends of the elongated members are pivotally secured to the transversely extending frame adjacent the outer ends thereof. Hydraulic cylinders interconnect the tubular member and the elongated members to cause the transversely extending frame to be moved from a field position to a folded transport position. The second tubular member is selectively slidably moved rearwardly with respect to the first tubular member so that the trailing implement connected thereto may be moved rearwardly with respect to the implements connected to the tranversely extending frame when the frame is moved to its folded transport position so that the overall width of the apparatus is reduced.

7 Claims, 4 Drawing Figures

U.S. Patent  Sept. 12, 1978  4,113,273
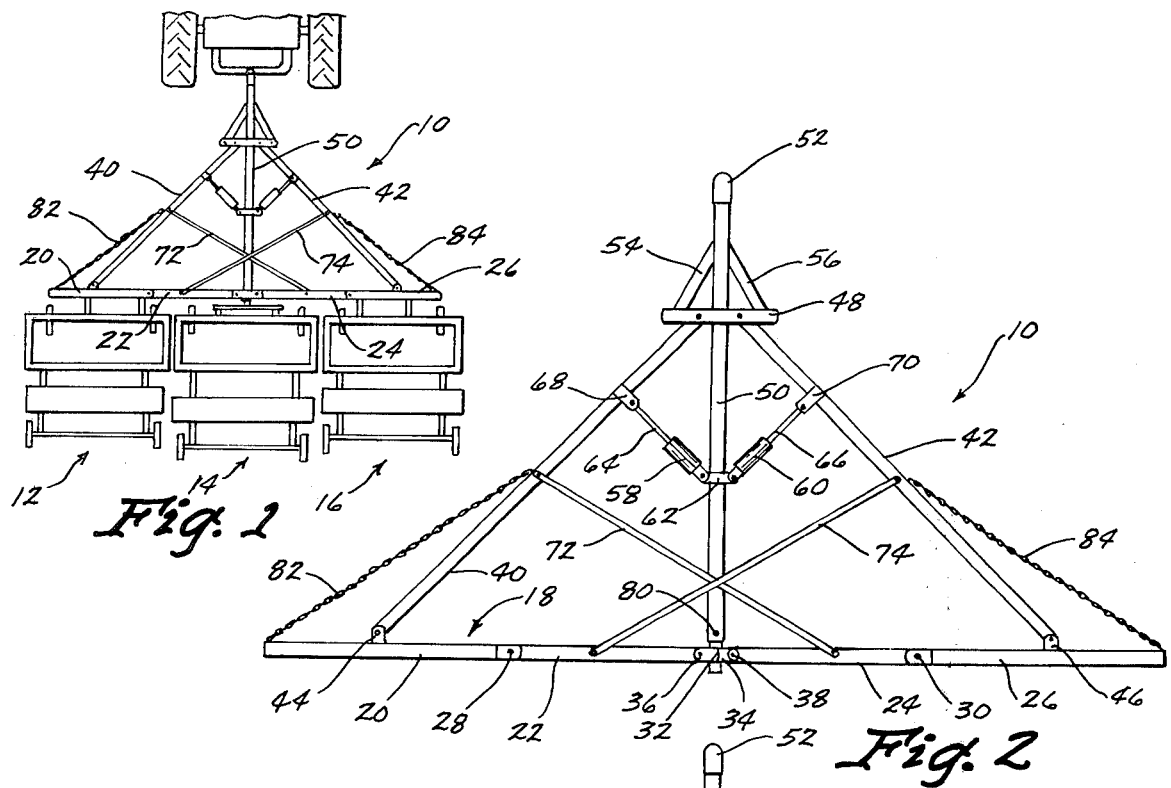
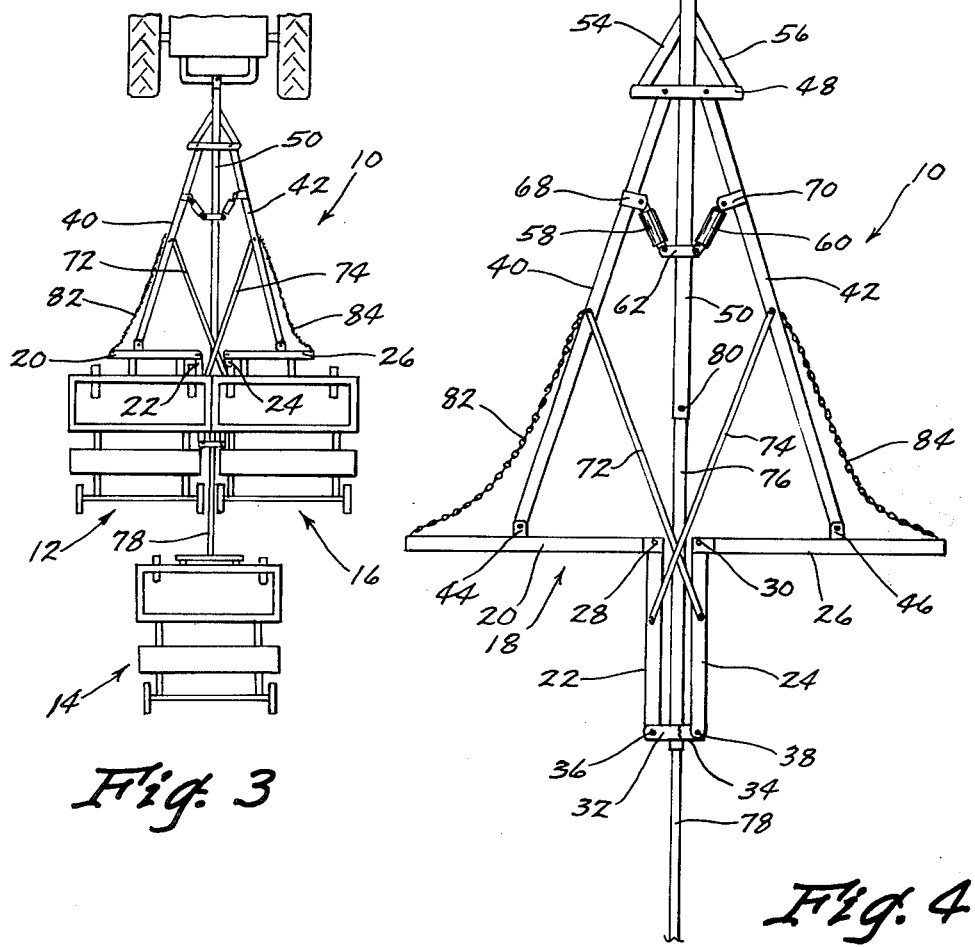
Fig. 1
Fig. 2
Fig. 3
Fig. 4

MULTIPLE IMPLEMENT FOLDING HITCH

BACKGROUND OF THE INVENTION

This invention relates to a hitch and more particularly to a hitch which is adapted to have a plurality of implements connected thereto.

The advent of extremely large and powerful tractors has made it possible to pull a plurality of implements such as drills, cultivators, discs, etc. through the field with the implements being arranged in a transversely extending side-by-side relationship. The implements are ordinarily connected to some sort of gang-type hitch and the overall width of the resulting apparatus is quite wide. A problem arises when the implements are to be moved from one field to another since the overall width of the implements is such that it is difficult to pull the same on highways, road, etc.

Heretofore, the implements were sometimes moved from the field position to a transport position wherein the implements were pulled one behind the other. The necessity of disconnecting the implements from the hitch and arranging the implements in such a relationship is time consuming and bothersome.

Therefore, it is a principal object of the invention to provide a multiple implement hitch.

A further object of the invention is to provide a multiple implement folding hitch which may be easily and conveniently moved from a field position to a transport position.

A still further object of the invention is to provide a multiple implement folding hitch which permits the implements to be pulled in a side-by-side relationship during field operations and quickly moved therefrom to a narrower transport position.

A still further object of the invention is to provide a multiple implement folding hitch which is economical to manufacture and durable in use.

SUMMARY OF THE INVENTION

The foling hitch of this invention comprises a transversely extending frame means comprised of a plurality of frame members pivotally connected together in an end-to-end relationship. A tubular means extends forwardly from the center of the transversely extending frame means and is adapted to have its forward end operatively connected to the prime mover such as a tractor or the like. A second tubular means is telescopically received by the rearward end of the first tubular means and is adapted to have at least one of the trailing implements connected thereto. Other trailing implements are connected to the transversely extending frame means laterally of the center implement. A pair of frame members are pivotally connected at their forward ends to the forward end of the first tubular means and extend rearwardly and outwardly therefrom for pivotal connection to the outer ends of the transversely extending frame means. Hydraulic cylinders pivotally interconnect the first tubular means to the first and second frame members for causing the first and second frame members to be moved towards one another whereby the transversely extending frame means will be pivotally moved from a field position to a folded transport position. The second tubular means is selectively slidably moved rearwardly with respect to the first tubular means prior to the folding operation of the transversely extending frame means so that the center implement may be positioned rearwardly of the other trailing implements so that the overall width of the apparatus is reduced for transport.

BRIEF DESCRIPTION OF THE DRAWINGS

FIG. 1 is a top view of the hitch of this invention illustrating the trailing implements in schematic form:

FIG. 2 is a top view of the hitch in the field position:

FIG. 3 is a view similar to FIG. 1 except that the hitch has been moved to its transport position; and FIG. 4 is a view similar to FIG. 2 except that the hitch has been moved to its transport position.

DESCRIPTION OF THE PREFERRED EMBODIMENT

The hitch of this invention is referred to generally by the reference numeral 10 while the numerals 12, 14 and 16 refers schematically to field implements such as drills, cultivators, discs, etc.

Hitch 10 comprises a transversely extending and horizontally disposed frame means 18 comprised of frame members 20, 22, 24 and 26. As seen in the drawings, frame members 20 and 22 are pivotally connected together about a vertical axis at 28 while the frame members 24 and 26 are pivotally connected together about a vertical axis at 30. Vertically spaced-apart plates 32 and 34 pivotally connect the inner ends of frame members 22 and 24 at vertical axes 36 and 38.

Frame members 40 and 42 are pivotally connected at their rearward ends to brackets 44 and 46 respectively which are secured to frame members 20 and 26 respectively as seen in the drawings. Frame members 40 and 42 extend forwardly and inwardly from the frame means 18 and are pivotally connected at their forward ends to a transversely extending frame member 48 as illustrated in the drawings. The numeral 50 refers to a tubular member which is secured to the frame member 48 intermediate the length thereof and which extends forwardly and rearwardly therefrom. The forward end of tubular member 50 is provided with means 52 at its forward end for connection to the prime mover such as a tractor or the like. Braces 54 and 56 interconnect the forward end of tubular member 50 to the outer ends of the frame member 48 for strengthening purposes.

The numerals 58 and 60 refer to hydraulic cylinders which are pivotally connected at one end thereof to a bracket 62 secured to tubular member 50. The rods 64 and 66 of cylinders 58 and 60 are pivotally connected to brackets 68 and 70 secured to frame members 40 and 42 respectively adjacent the forward ends thereof. Brace 72 is pivotally connected at its forward end to frame member 40 and is pivotally connected at its rearward end to frame member 24. Brace 74 is pivotally connected at its forward end to frame member 42 and is pivotally connected at its rearward end to frame member 22. The numeral 76 refers to a tubular member which is telescopically received by the rearward end of tubular member 50. Depending upon the particular implement being employed, it may be necessary to telescopically position a tubular member 78 within tubular member 76. As illustrated in FIG. 1, pin 80 is extended through registered openings in tubular members 50, 76 and 78 to maintain the tubular members in the telescoped position. As illustrated in the drawings, the rearward end of tubular member 50 is positioned so that tubular member 76 is positioned between the vertically disposed plates 32 and 34. The numerals 82 and 84 refer to safety chains which extend between the outer ends of the frame means 18 and the frame members 40 and 42 respectively as illustrated. If desired, the chains 82 and 84 may be replaced by suitable link arms. Although the drawings do not illustrate a wheel means for the hitch, it should be noted that suitable supporting caster wheel assemblies may be secured to frame members 40 and 42 or to frame means 18.

In normal field operation, the hitch 10 is secured to the prime mover such as a tractor or the like as illustrated in FIGS. 1 and 3. The trailing implements may be comprised of discs, cultivators, drills, etc. and are represented in FIGS. 1 and 3 in schematic form and identified with the reference numerals 12, 14 and 16. In normal field use, implement 12 is operatively connected to frame member 20 while implement 16 is operatively connected to frame member 26 by any convenient means. Implement 14 is operatively secured to the rearward end of tubular member 78 and the tubular members 50, 76 and 78 are maintained in the telescoped position of FIGS. 1 and 2 by means of pin 80 extending through registering openings therein. As the implements are pulled through the field in the end-to-end relationship seen in FIG. 1, the chains 82 and 84 tend to add strength to the outer ends of the frame members 20 and 26. Cylinder rods 64 and 66 of cylinders 58 and 60 are extended as illustrated in FIGS. 1 and 2 and such extension prevents the hitch from moving to its folded or transport position.

When it is desired to transport the implements to another location, pin 80 is initially removed and the tractor is driven forwardly. As the tractor moves forwardly, the center implement 14 remains stationary while the implements 12 and 16 move forwardly with the hitch 10. As the tractor is driven forwardly, tubular members 76 and 78 slidably move rearwardly relative to the tubular member 50 so that the implement 14 is positioned rearwardly of the implements 12 and 16. The operator then secures the tubular members 76 and 78 in the extended position by any convenient means such as pins or the like extending therethrough. The operator then drives the tractor forwardly while simultaneously actuating the hydraulic cylinders 58 and 60 so that the rods 64 and 66 are withdrawn thereinto. Retraction of the cylinder rods 64 and 66 causes frame members 40 and 42 to be pivotally moved inwardly relative to the frame member 48 and the tubular member 50. As frame members 40 and 42 pivotally move inwardly, braces 72 and 74 create a rearward force on the inner ends of the frame members 22 and 24 which causes the frame members 22 and 24 to pivotally move from the position of FIG. 2 to the position of FIG. 4. Thus, as the tractor is being moved forwardly and the cylinders 58 and 60 are being activated, the overall effective width of the hitch 10 is reduced from the field position of FIGS. 1 and 2 to the transport position of FIGS. 3 and 4.

When it is necessary to move the hitch from the transport position of FIGS. 3 and 4 to the field position of FIGS. 1 and 2, the tractor operator pulls the assembly forwardly while causing the rods 64 and 66 of cylinders 58 and 60 to be extended. Extension of the rods 64 and 66 causes the frame members 22 and 24 to be pivotally moved from the position of FIGS. 3 and 4 to the position of FIGS. 1 and 2. After the hitch has been moved to the position of FIG. 2, the tubular members 76 and 78 are freed from their mutual engagement. The tractor is then moved rearwardly which causes the hitch 10 and the implements 12 and 16 to be moved rearwardly while the implement 14 remains stationary. As the tractor and the implements 12 and 16 are being moved rearwardly, tubular member 78 is slidably received within tubular member 76 and tubular member 76 is slidably received within tubular member 50. The tractor is moved rearwardly until the center implement 14 is located in the position illustrated in FIG. 1. The pin 80 is then extended through the tubular members 50, 76 and 78.

It should be noted that any number of implements may be operatively connected to the hitch 10. It should also be noted that in many situations, tubular member 78 may be omitted since tubular member 78 is merely provided to permit a "long" center implement to be moved sufficiently rearward relative to the lateral implements 12 and 16.

Thus it can be seen that a novel hitch has been provided which enables a plurality of trailing implements to be pulled in an end-to-end relationship during field operations but which is easily folded inwardly to a transport position to enable the overall width of the trailing implements to be effectively reduced. Thus it can be seen that the hitch of this invention accomplishes at least all of its stated objectives.

I claim:

1. A multiple implement folding hitch, comprising,
    a first normally transversely extending and substantially horizontally disposed frame means comprised of a plurality of frame members pivotally connected together about vertical axes in an end-to-end relationship, said frame means being movable from the transversely extending field position to a folded transport position, said first frame means adapted to have at least a pair of trailing implements operatively connected thereto,
    a first longitudinally extending and substantially horizontally disposed tubular frame means extending forwardly from the center of said first frame means for operative connection to a prime mover,
    a first elongated member operatively pivotally connected at its forward end to said first tubular frame means adjacent the forward end thereof and extending rearwardly and outwardly therefrom and being operatively pivotally connected to said first frame means adjacent one outer end thereof,
    a second elongated member operatively pivotally connected at its forward end to said first tubular frame means adjacent the forward end thereof and extending rearwardly and outwardly therefrom and being operatively pivotally connected to said first frame means adjacent the other outer end thereof,
    a second tubular frame means selectively telescopically mounted in said first tubular frame means adapted to have at least a third trailing implement connected thereto between the said pair of trailing implements when said first frame means is in its field position, said second tubular frame means adapted to be slidably moved rearwardly with respect to said first tubular frame means to permit the said third trailing implement connected thereto to be positioned rearwardly of the said pair of implements when said first frame means is moved to its folded transport position,
    and means for maintaining said first frame means in said field and transport position.

2. The hitch of claim 1 wherein said means for maintaining said first frame means in said field and transport position comprises a length adjustable means.

3. The hitch of claim 2 wherein said length adjustable means comprises a first hydraulic cylinder means operatively pivotally secured at one end to said first elongated member and operatively pivotally connected at its other end to said first tubular frame means and a second hydraulic cylinder means operatively pivotally secured at one end to said second elongated member and operatively pivotally connected at its other end to said first tubular frame means.

4. The hitch of claim 1 wherein connection means extends between said outer ends of said first frame means and said first and second elongated members.

5. The hitch of claim 1 wherein said first frame means comprises first, second, third and fourth frame members pivotally connected together in an end-to-end relationship, said first and second elongated members being pivotally secured at their rearward ends to said first and fourth frame members respectively, said first tubular frame means extending forwardly from the pivotal connection of said second and third frame members, said second and third frame members pivotally moving rearwardly with respect to said first and fourth frame members when said first frame means is moved to its transport position, said second tubular frame means adapted to extend rearwardly between said second and third frame members when said first frame means is in its transport position.

6. The hitch of claim 5 wherein said second tubular frame means comprises first and second telescopic members.

7. A multiple implement hitch, comprising,
a first normally transversely extending and substantially horizontally disposed frame means comprised of a plurality of frame member operatively connected together for movement from the transversely extending field position to a reduced length transport position, said first frame means adapted to have at least a pair of trailing implements operatively connected thereto,
a first longitudinally extending and substantially horizontally disposed tubular frame means extending forwardly from the center of said first frame means for operative connection to a prime mover,
a first elongated member operatively pivotally connected at its forward end to said first tubular frame means adjacent the forward end thereof and extending rearwardly and outwardly therefrom and being operatively pivotally connected to said first frame means adjacent one end thereof,
a second elongated member operatively pivotally connected at its forward end to said first tubular frame means adjacent the forward end thereof and extending rearwardly and outwardly therefrom and being operatively pivotally connected to said first frame means adjacent the other end thereof,
a second tubular frame means selectively telescopically mounted in said first tubular frame means adapted to have at least a third trailing implement connected thereto between the said pair of trailing implements when said first frame means is in its field position, said second tubular frame means adapted to be slidably moved rearwardly with respect to said first tubular frame means to permit the said third trailing implement connected thereto to be positioned rearwardly of the said pair of implements when said first frame means is moved to its transport position.
and means for maintaining said first frame means in said field and transport positions.

* * * * *